United States Patent [19]

Assaf et al.

[11] Patent Number: 5,017,043
[45] Date of Patent: May 21, 1991

[54] METHOD OF AN MEANS FOR CONTROLLING PRECIPITATION IN EVAPORATION PONDS

[75] Inventors: Gad Assaf, Rehovot; Benjamin Doron, Jerusalem, both of Israel

[73] Assignee: Geophysical Engineering Company, Seattle, Wash.

[21] Appl. No.: 479,619

[22] Filed: Feb. 13, 1990

[51] Int. Cl.$^5$ .......................... B01D 1/00; B01D 9/02; C01D 3/06

[52] U.S. Cl. .......................... 405/52; 405/53; 405/74; 20/170; 20/747

[58] Field of Search .......... 405/52, 53, 58, 59, 405/73, 74, 128; 210/170, 205, 207, 221.2, 702, 723, 747

[56] References Cited

U.S. PATENT DOCUMENTS

| | | | |
|---|---|---|---|
| 3,365,178 | 1/1968 | Bood | 405/52 X |
| 3,966,541 | 6/1976 | Sadan | 405/58 X |
| 4,039,439 | 8/1977 | Clark | 210/170 X |
| 4,336,999 | 6/1982 | Assaf | 126/415 X |
| 4,911,849 | 3/1990 | Labesque et al. | 210/747 |

FOREIGN PATENT DOCUMENTS 886580 8/1953 Fed. Rep. of Germany ........ 405/52

Primary Examiner—Randolph A. Reese
Assistant Examiner—John Ricci
Attorney, Agent, or Firm—Sandler, Greenblum & Bernstein

[57] ABSTRACT

A method of and apparatus for controlling precipitation in evaporation ponds containing brine is provided wherein brine to be concentrated is introduced into a pond at at least one brine entrance, this brine being mixed in the vicinity of the entrance with bine present in the pond by enhanced brine mixing apparatus such that precipitation of salts occurs and salt deposits form in the vicinity of the entrance. This salt deposits collect in a collection basin at the floor of the pond. Brine present in the pond can be close to saturation or even saturated with respect to at least one of the salts contained therein. Deposits present in the collection basin can be removed to a location external to the pond by removal apparatus preferably including a mechanical scapper and conveying or transporting apparatus. A submerged source of compressed air producing bubbles or a motorized propellor mixer may be used to enhance the mixing of the brines near the brine entrance. When a source of compressed mixing is used to enhance mixing, a perforated pipe wherein the compressed air exits through the perforations or holes can be used for this purpose.

20 Claims, 4 Drawing Sheets

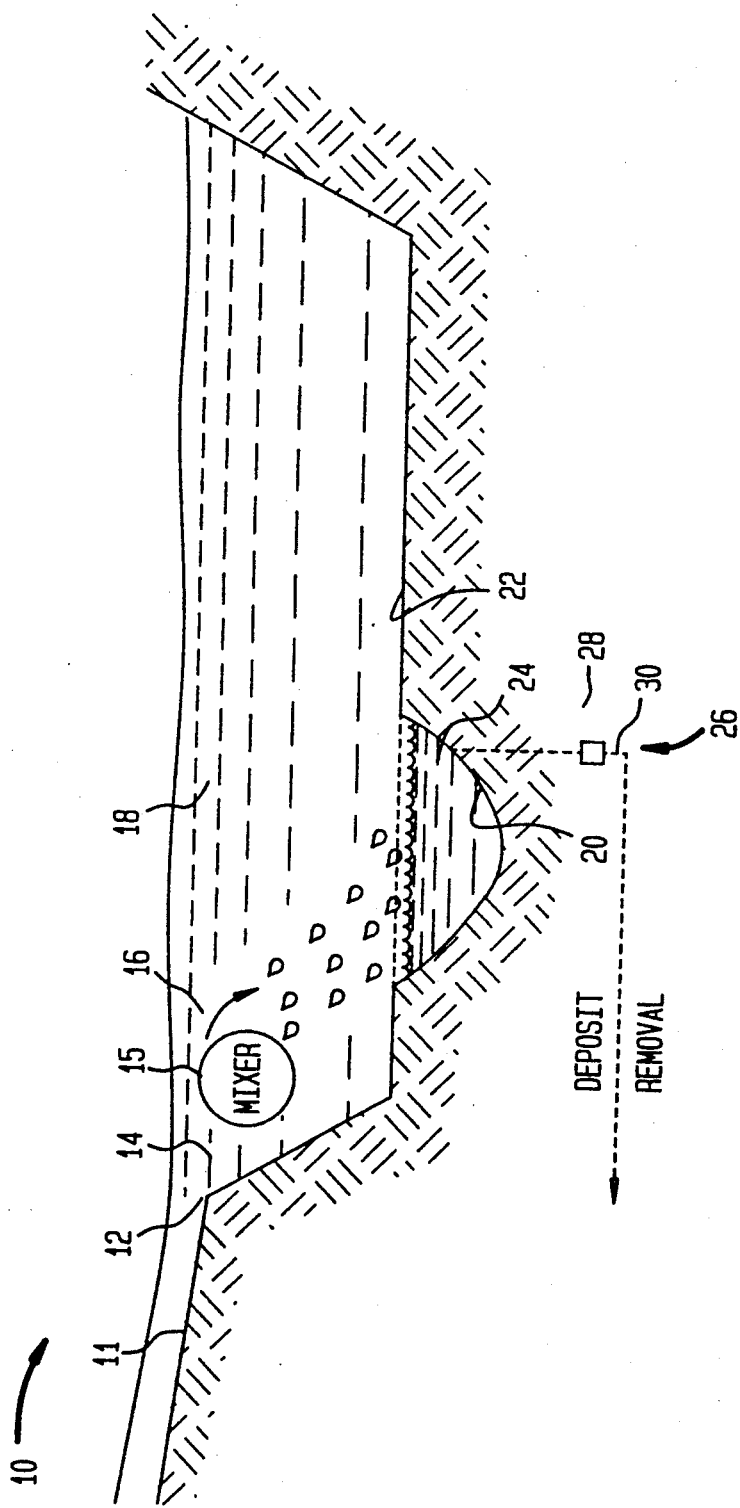

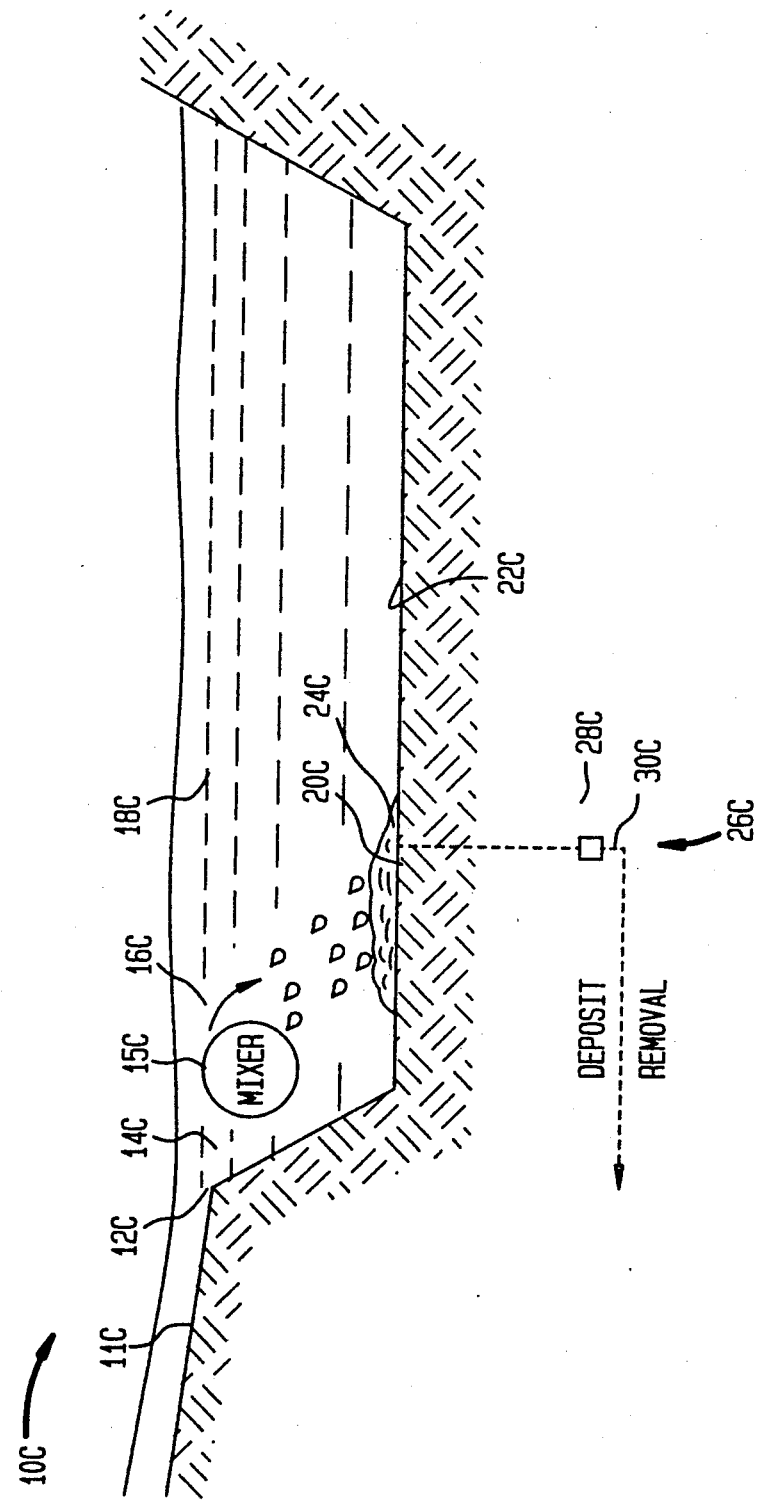

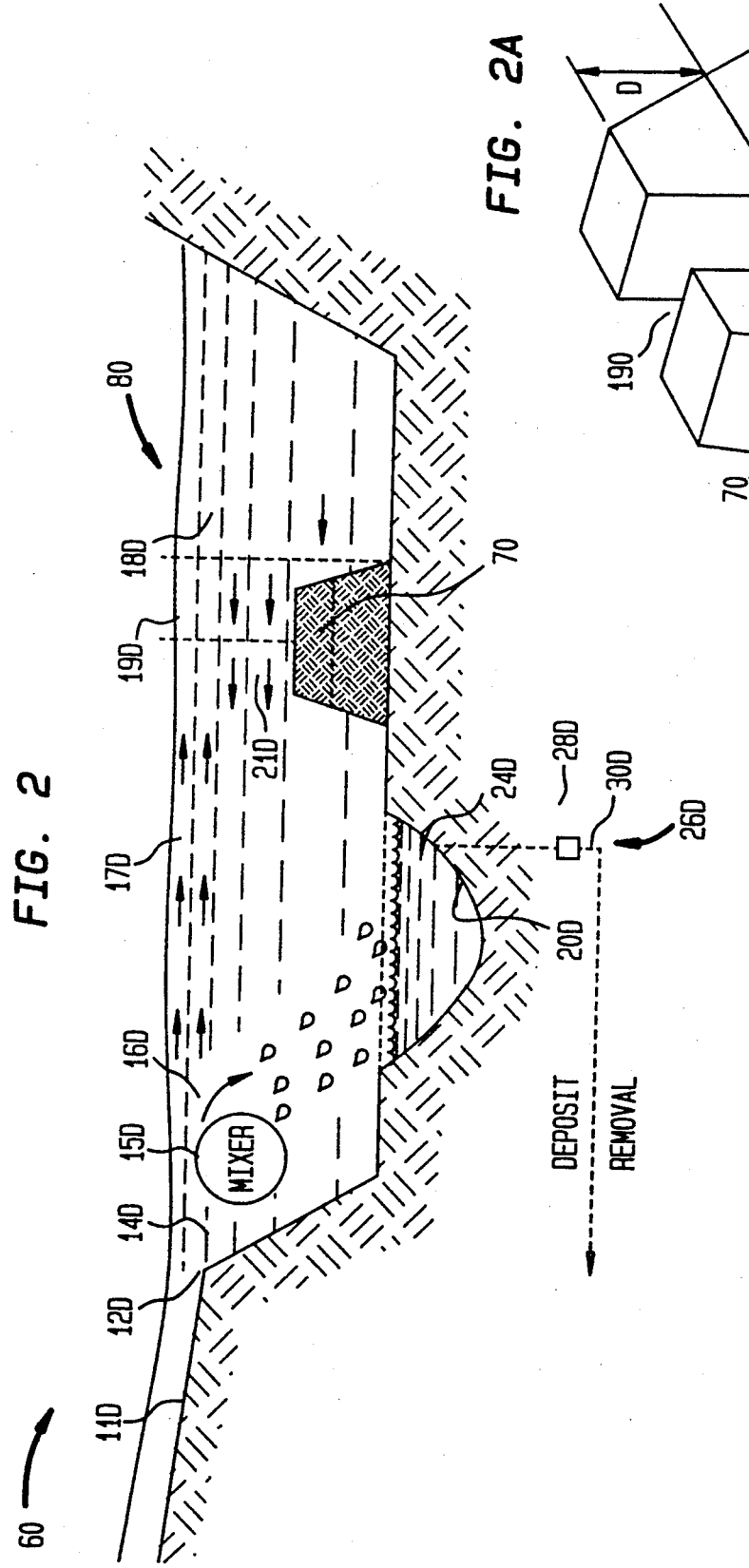

– 5,017,043 –

METHOD OF AN MEANS FOR CONTROLLING PRECIPITATION IN EVAPORATION PONDS

TECHNICAL FIELD

This invention generally is related to salt precipitation in evaporation ponds and more particularly is concerned with a method of and means for controlling precipitation in evaporation ponds.

BACKGROUND TO THE INVENTION

Evaporation ponds are used around the world to concentrate brine. In such evaporation ponds, it has been found that salt precipitates out and deposits build up. Often, these deposits build up to such an extent that growths or even islands of crystallized salts and deposits are produced sometimes over very large areas of the pond. This seriously reduces the evaporation area of the pond and consequently reduces the production levels of such ponds. The rate of build up of such deposits and precipitants is enhanced even more when growths and deposits are already present in the pond.

The occurance of such phenomena is quite common when the aqueous solution or brine present in the evaporation pond is close to saturation or even saturated with respect to at least one of the salts contained in the solution. As the brine to be concentrated enters the evaporation pond, saturation and precipitation occurs along substantially all of the flow interface between the brine flowing into the pond and the brine in the pond. The area of this interface can take up a substantial area of the pond since usually the density of the brine entering the pond is lower than that of the brine present in the pond causing this lower density and lighter brine to float on the brine in the pond for a substantial distance into the pond.

Furthermore, the growths and deposits present in such ponds have often been found to contain quite large crystals and massive crystal growths making their removal difficult.

It is therefore an object of the present invention to provide a method of and means for controlling precipitation and the extent of deposits in an evaporation pond or ponds wherein the problems and disadvantages as outlined are reduced or substantially overcome.

SUMMARY OF THE INVENTION

The present invention provides a method of and means for controlling precipitation in an evaporation pond or ponds containing brine wherein brine to be concentrated is introduced into a pond at at least one brine pond entrance, this brine being mixed in the vicinity of the entrance with brine present in the pond by enhanced brine mixing means such that precipitation of salts occurs and salt deposits form in the vicinity of the entrance. Brine is taken to include any aqueous solution containing salts. The salt deposits collect in a collection area or basin at the floor of the pond. Brine present in the pond can be close to saturation or even saturated with respect to at least one of the salts contained therein.

Deposits present in the collection basin can be removed to a location external to the pond by removal means preferably including a mechanical scapper and conveying or transporting means. Preferably, a submerged source of compressed air producing bubbles is used to enhance the mixing of the brines near the brine entrance. A perforated pipe having holes wherein the compressed air exits through the perforations or holes can be used for this purpose. Optionally, a motorized propellor mixer can be used as a brine enhanced mixing means.

BRIEF DESCRIPTION OF THE DRAWINGS

Embodiments of the invention are described and illustrated by way of example with reference to the accompanying drawings wherein:

FIG. 1 is a schematic diagram of an evaporation pond in accordance with the present invention;

FIG. 1C is a schematic diagram of a further embodiment of the present invention;

FIG. 2 is a schematic diagram of another embodiment of the present invention; and FIG. 2A is a cross-sectional view of a barrier or dyke having an opening used in the embodiment of the present invention shown in FIG. 2.

DETAILED DESCRIPTION

Figure 1B:
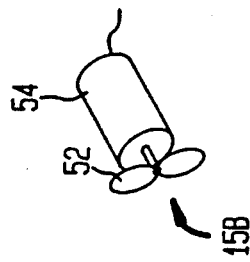
FIG. 1B shows a further embodiment of the enhanced brine mixing means in accordance with the present invention.

Referring to FIG. 1, reference numeral 10 designates an evaporation pond in accordance with the present invention containing brine for evaporation. Brine supply means 11, such as a duct or pipe, having brine pond entrance 12 is provided for permitting brine 14 to enter into the pond while enhanced brine mixing means or mixer 15, located in the vicinity of brine entrance 12, is provided for enhancing mixing of brine 14 entering the pond with brine 18 present in the pond and forms region of enhanced mixing 16 near the brine entrance. Often, brine 18 present in the pond is at saturation or close to saturation with respect to at least one of the salts contained therein, e.g. sodium chloride (NaCl).

Collector basin 20, being preferably an indented basin in pond floor 22, located substantially adjacent brine entrance 12, enables precipitants formed as a result of the operation of mixer 15 and possibly other material to collect as deposits 24 in a convenient location. Deposit removal means 26, preferably comprising extraction means 28 such as a mechanical dreger and transporting means 30, may be used if and when necessary to remove deposits 24 collected in basin 20. Transporting means 30 is provided for transporting deposits 24 extracted from the collection basin to a convenient location as required.

In operation, as brine 14 enters pond 10, mixer 15 enhances the mixing of this brine with brine 18 present in the pond in the vicinity of brine entrance 12 causing precipitation of salts, e.g. NaCl, to occur in this region of the pond. This is because such mixing ensures that the brine entering the pond is thoroughly mixed in this region with the brine in the pond even though the density of the brine entering the pond is normally less than the density of the brine present in the pond. Mixing of this nature can bring about flow currents in the brine in the pond which may even cause brine present at large distances from the brine pond entrance to reach the vicinity of region of enhanced mixing 16 and take part in such mixing. Consequently, in the present invention, the area of the pond where there is an interface between brine 14 flowing into the pond and brine 18 present in the pond is substantially reduced compared with the situation in the prior art where, the inflowing brine, normally being lighter than the brine present in the pond due to its lower density, floats for quite a substantial distance on the brine in the pond and produces an extensive flow interface area between brine flowing into the pond and brine in the pond which takes up a considerable area of the pond as no enhanced mixing devices are used.

Thus, in the present invention, as a consequence of enhanced mixing, lighter brine is thoroughly mixed with heavier brine present in the pond and precipitation is localized to the region near the brine entrance into the pond whereas in the prior art, precipitation can occur along the whole extensive pond area where there is an interface of the inflowing, lighter and floating brine with the heavier brine present in the pond. When the brine in pond 10 is saturated or almost saturated with respect to at least one of the salts contained in this brine, precipitation may occur via a desalting process wherein the salt, close to saturation level, e.g. sodium chloride (NaCl), precipitates out due to the addition of appropriate levels of salts contained in the brine flowing into the pond.

Precipitants formed in the present invention should have small dimensions in comparison with those formed in the prior art, since they are formed in a region of vigorous brine flow brought about by the operation of mixer 15. This small size facilitates their removal. These precipitants and possibly other material settle and deposit as deposits 24 in collection basin 20. Such deposits are removed when necessary by removal means 26 using extraction means 28 and transportation means 30. A mechanical dreger or other convenient means including a conveyer can be used for such purposes.

Figure 1A:
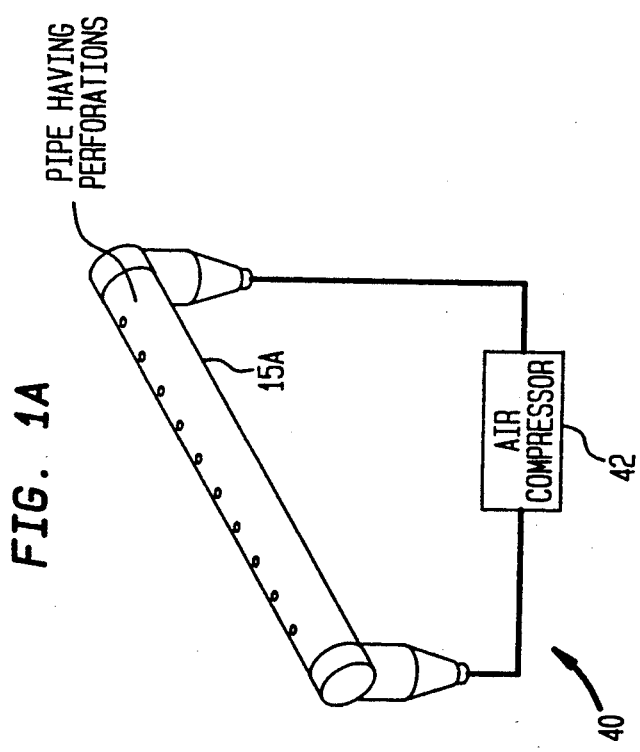
FIG. 1A shows an embodiment of the enhanced brine mixing means in accordance with the present invention.

Embodiments of enhanced brine mixing means or mixer 15 are shown in FIG. 1A and 1B wherein in FIG. 1A numeral 40 designates a mixer system including air compressor 42 and perforated pipe 15A having holes for supplying compressed air through the perforations or holes to brine in the pond when the pipe is positioned in the pond. Since, in the present invention, the pipe is submerged, the compressed air exits the pipe and forms bubbles thus enhancing the mixing of brine in the area adjacent the brine entrance of the pond.

Mixer 15B shown in FIG. 1B includes propeller 52 and motor 54 such that when operated and positioned in a submerged location near brine pond entrance 12 as shown in FIG. 1, propeller 52 run by motor 54 brings about the enhanced mixing of brine in the pond adjacent brine entrance 12.

In an example of the operation of the present invention, brine from the Dead Sea having a density of about 1,235 kg/m$^3$ enters evaporation pond 10 whose width is 500 meters and length is 1000 meters and is mixed with brine in the evaporation pond whose density can be close to 1,290 kg/m$^3$. Mixer 15, taking the form of a perforated pipe for supplying compressed air and having a length of 200 meters and positioned in a submerged location approximately 100 meters from brine entrance 12 causes the brine entering the pond to thoroughly mix in the region near the brine entrance with the brine present in the pond. As a result, large amounts of higher density brine are brought in contact with the lighter brine bringing about precipitation such that precipitants, mainly NaCl, settle in the collection basin having a width of 100 meters and length of 500 meters. As a consequence of the mixing, brine leaving the vicinity of the mixer in the upper portion of the pond will have a density of approximately 1,280 kg/m$^3$.

While the above description refers to collection basin 20 as an indentation in the pond floor 22 as shown in FIG. 1, if preferred or convenient, the present invention also envisages that such a collection basin can be present as an area substantially at the same height of the pond floor as shown in FIG. 1C. In such a case, removal means 26C can be operated if necessary on an almost continuous basis in order to remove deposits that collect in area 20C. Furthermore, even though a single brine entrance is described for pond 10, more than a single brine pond entrance may be used in the present invention, each entrance being associated with a mixer for enhancing the mixing and consequently causing precipitation in the vicinity of each brine entrance.

In addition, while the above description of the present invention refers, particularly with reference to FIG. 1, to the carrying out of the present invention within an evaporation pond, it is envisaged that the present invention may also be carried out, if convenient, in a separate pond as shown in FIG. 2 including a mixer or enhanced mixing means and collection basin shown as an indentation in the pond floor. If preferred, also here, collection basin 20D can be present as a deposit collection area at the same height as the pond floor. Brine 18D contained in the evaporation pond 80 is supplied to separate pond 60 for mixing with brine 14D to be concentrated entering this pond. As is shown in the theory of two-layer flow in estuaries given by Stommel and Farmer (Journal of Marine Research, 11, 205-214, 1957), in the theory of two-layer flow for sea straits, given by Assaf and Hecht (Deep Sea Research, Vol. 21, 947-948, 1974) and also in the two-layer theory given for seasonally storing heat in a body of water by Assaf in U.S. Pat. No. 4,498,454, the disclosures of which are hereby incorporated by reference, the size of an opening to a mixing region, e.g. its width and depth, controls the flow, concentration and density of brine or salt water exiting the mixing region in the case of "overmixing". In the present invention, the amount of brine 21D supplied from the evaporation pond for mixing with brine 14D to be concentrated to the amount of brine 17D exiting region of enhanced mixing 16D in the vicinity of the mixer and the salt concentration and density of brine 17D is controlled by controlling the size e.g. width and depth, of opening 19D in the barrier connecting pond 60 to evaporation pond 80. This is the case when brine 21D supplied from evaporation pond 80 is overmixed with brine 14D entering pond 60 such that further mixing by mixer 15D will not influence the amount of brine 21D entering pond 60 from evaporation pond 80. Barrier or dyke 70 having opening 19D of width W and depth D connecting pond 60 to evaporation pond 80 is shown in greater detail in FIG. 2A. Of course, if preferred, other means for connecting an evaporation pond or ponds to such a pond as pond 60, shown in FIG. 2, can be used wherein in such cases the size of this connection will control the amount of brine supplied from the evaporation pond and the density and concentration of brine exiting the vicinity of a mixer used in a pond such as pond 60 shown in FIG. 2.

In the present invention, a narrow and shallow opening, e.g. opening 19D having a width W of 50 meters and depth D of 4 meters, will give a relatively low concentration or density, e.g. 1,245 kg/m$^3$ for brine 17D leaving pond 60 when the density of brine 14D entering pond 60 is about 1,235 kg/m$^3$. On the other hand, a deep and wide opening, e.g. opening 19D having a width W of 200 meters and depth D of 4 meters, will result in effective mixing in pond 60 and a relatively high salt concentration and density, e.g. 1,285 kg/m$^3$, for brine 17D leaving the pond when the density of brine 14D entering the pond has a density of approximately 1,235 kg/m$^3$, the density of brine 21D entering pond 60 from evaporation pond 80 being about 1,290 kg/m$^3$.

Even though the above description refers to removing deposits using deposit removal means if and when necessary, if preferred such deposits can be left at the floor of such ponds. This can be the case for example where such deposits would lead to the stabilization or the strenghtening of the soil in the vicinity of the pond floor.

It is believed that the advantages and improved results furnished by the method and means or apparatus of the present invention are apparent from the foregoing description of the embodiments of the invention. Various changes and modifications may be made without departing from the spirit and scope of the invention as described in the claims that follow.

What is claimed is:

1. A method for controlling precipitation in ponds containing brine comprising the steps of:
   (a) introducing brine for concentration into a pond at at least one brine pond entrance; and
   (b) enhancing mixing in the vicinity of said entrance producing a region of enhanced mixing between the brine introduced into the pond and the brine present in the pond such that precipitation of salts occurs and precipitants form in the vicinity of said entrance and settle as deposits in a collection area.

2. A method according to claim 1 wherein said collection area is a collection basin indented in the pond floor of said floor.

3. A method according to claim 1 further comprising the step of extracting deposits from said collection area.

4. A method according to claim 3 wherein the extraction of said deposits is carried out using a mechanical dreger and means for transporting said deposits to a location external to the pond.

5. A method according to claim 1 wherein said enhanced mixing is carried out using a submerged source of compressed air for producing air bubbles.

6. A method according to claim 5 wherein said air bubbles are produced by compressed air exiting a submerged pipe having holes.

7. A method according to claim 1 wherein said brine present in the pond is substantially saturated with respect to at least one salt contained therein.

8. A method according to claim 7 wherein said brine present in the pond is substantially saturated with respect to NaCl.

9. A method according to claim 1 wherein said brine present in said pond is supplied from brine present in an evaporation pond.

10. A method according to claim 9 wherein the brine present in said pond is supplied from brine present in an evaporation pond using a barrier having an opening connecting said pond to said evaporation pond.

11. A method according to claim 10 further comprising the step of controlling the supply of brine from said evaporation pond and the density of brine exiting the region of enhanced mixing by controlling the size of said opening in barrier connecting said pond to said evaporation pond.

12. A method according to claim 10 further comprising the step of controlling the supply of brine from said evaporation pond and the density of brine exiting the region of enhanced mixing by controlling the width and depth of said opening in barrier connecting said pond to said evaporation pond.

13. A method according to claim 9 further comprising the step of controlling the supply of brine from said evaporation pond and the density of brine exiting the region of enhanced mixing by controlling the size of a connection connecting said pond to said evaporation pond.

14. An evaporation pond comprising:
   (a) at least one brine pond entrance for introducing brine to be concentrated into said pond;
   (b) enhanced brine mixing means for enhancing mixing in the vicinity of said brine entrance between brine introduced into said pond and brine present in the pond such that precipitation of salts occurs and precipitants form in the vicinity of said entrance; and
   (c) a collection basin in the form of an indentation in the floor of the pond substantially adjacent said entrance for collecting said precipitants as deposits.

15. An evaporation pond according to claim 14 further comprising removal means for removing deposits from said collection basin.

16. An evaporation pond according to claim 15 wherein said removal means for removing deposits includes a mechanical dreger and means for transporting said deposits to a location external to the evaporation pond.

17. An evaporation pond according to claim 14 wherein said enhanced brine mixing means for enhancing mixing includes a submerged source of compressed air for producing air bubbles.

18. An evaporation pond according to claim 17 wherein said source of compressed air includes a submerged pipe having holes.

19. An evaporation pond according to claim 14 wherein said brine present in the pond is substantially saturated with respect to at least one salt contained therein.

20. An evaporation pond according to claim 19 wherein said brine present in the pond is substantially saturated with respect to NaCl.

* * * * *